(12) United States Patent
Chen et al.

(10) Patent No.: US 12,460,235 B2
(45) Date of Patent: Nov. 4, 2025

(54) BACILLUS SUBTILIS NATTO AND METHOD FOR PRODUCING MK-7

(71) Applicant: SUNGEN BIOSCIENCE CO., LTD., Shantou (CN)

(72) Inventors: Jiepeng Chen, Shantou (CN); Lili Duan, Shantou (CN); Lin Hong, Shantou (CN); Yufan Chen, Shantou (CN); Hongrui Chen, Shantou (CN); Yeyu Ji, Shantou (CN); Chunli Cai, Shantou (CN); Liusong Hu, Shantou (CN); Zhikai Xu, Shantou (CN)

(73) Assignee: SUNGEN BIOSCIENCE CO., LTD., Shantou (CN)

( * ) Notice: Subject to any disclaimer, the term of this patent is extended or adjusted under 35 U.S.C. 154(b) by 1105 days.

(21) Appl. No.: 17/434,559

(22) PCT Filed: Jul. 2, 2019

(86) PCT No.: PCT/CN2019/094333
§ 371 (c)(1),
(2) Date: Aug. 27, 2021

(87) PCT Pub. No.: WO2021/000246
PCT Pub. Date: Jan. 7, 2021

(65) Prior Publication Data
US 2022/0127652 A1  Apr. 28, 2022

(51) Int. Cl.
| | |
|---|---|
| *C12P 7/66* | (2006.01) |
| *A23L 33/135* | (2016.01) |
| *A23L 33/15* | (2016.01) |
| *A61K 31/122* | (2006.01) |
| *C12N 1/20* | (2006.01) |
| *C12R 1/125* | (2006.01) |

(52) U.S. Cl.
CPC .............. *C12P 7/66* (2013.01); *A23L 33/135* (2016.08); *A23L 33/15* (2016.08); *A61K 31/122* (2013.01); *C12N 1/205* (2021.05); *C12R 2001/125* (2021.05)

(58) Field of Classification Search
CPC ......... C12N 1/205; A61K 31/122; C12P 7/66; A23L 33/135; A23L 33/15; A23L 33/115; A23L 29/212; A23L 29/10; A23L 33/19; C12R 2001/125
See application file for complete search history.

(56) References Cited

U.S. PATENT DOCUMENTS 4,849,354 A * 7/1989 Takayama ............ C12P 7/66
435/830

FOREIGN PATENT DOCUMENTS

| CN | 100999711 A | * | 7/2007 | |
|---|---|---|---|---|
| CN | 101534807 A | | 9/2009 | |
| CN | 103898175 A | | 7/2014 | |
| CN | 104168772 A | | 11/2014 | |
| CN | 104262129 A | | 1/2015 | |
| CN | 104328064 A | * | 2/2015 | ............ C12N 1/20 |
| CN | 104357355 A | * | 2/2015 | |
| CN | 105963327 A | | 9/2016 | |
| CN | 106074377 A | | 11/2016 | |
| CN | 107058204 A | | 8/2017 | |
| CN | 107118991 A | | 9/2017 | |
| IN | 106455667 A | | 2/2017 | |
| JP | H08-073396 A | | 3/1996 | |
| WO | 2014131084 A1 | | 9/2014 | |

OTHER PUBLICATIONS

Sato, Toshiro; et al. "Production of Menaquinone (Vitamin K2)-7 by Bacillus subtilis", Journal of Bioscience and Bioengineering, vol. 91, No. 1, p. 16-20, 2001. (Year: 2001).*
Nicholson WL, et al. 2010. Exploring the Low-Pressure Growth Limit: Evolution of Bacillus subtilis in the Laboratory to Enhanced Growth at 5 Kilopascals . Appl Environ Microbiol 76:. https://doi.org/10.1128/AEM.01126-10. (Year: 2010).*
McNeill, J., Kakuda, Y. & Kamel, B. Improving the quality of used frying oils by treatment with activated carbon and silica. J Am Oil Chem Soc 63, 1564-1567 (1986). https://doi.org/10.1007/BF02553086 (Year: 1986).*
Column Chromatography, Aluminium Oxide Acidic; https://www.column-chromatography.com/aluminium-oxide/aluminium-oxide-acidic#:~:text=Aluminium%20Oxide%20Acidic%20finds%20its,its%20affinity%20for%20acidic%20moieties.*
Announcement No. 8 "National Health and Family Planning Commission," (2016).
National standards of the people's Republic of China, GB 5009.227, "National food safety standard Determination of peroxide value in food," (Aug. 31, 2016).
National standards of the people's Republic of China, GB5009.229, "National food safety standard Determination of peroxide value in food," (Aug. 31, 2016).
Jun. 5, 2019—Duan, Lili, English and foreign translation of Deposit Receipt and Visibility Statement; China General Microbiological Culture Collection Center (CGMCC) 2 pages.
Apr. 11, 2022—(EP) Extended Search Report—App 19936410.0.
Jun. 14, 2022—(JP) Notice of Reasons for Refusal—App 2021-546272.
Sato et al., "Production of Menaquinone (Vitamin K2)-7 by Bacillus subtilis", Research Laboratories, Honen Corporation, Journal of Bioscience and Bioengineering, vol. 91, No. 1, 16-20, 2001.
Apr. 9, 2020—(CN) International Search Report of PCT/CN2019/094333.

(Continued)

*Primary Examiner* — Sean C. Barron
(74) *Attorney, Agent, or Firm* — Banner & Witcoff, Ltd.

(57) ABSTRACT

Provided is a *Bacillus subtilis* natto strain ST-1008, deposited under the accession number CGMCC No. 17894. Also provided is a method for producing MK-7. The method comprises: culturing the *Bacillus subtilis* natto strain of CGMCC No. 17894 in a culture medium so as to produce MK-7 in the strain cell and the culture medium, and recovering and purifying MK-7 from the strain cell and the culture medium. Also provided are a MK-7 preparation, a MK-7 pure premix, and a pure MK-7.

10 Claims, No Drawings

(56) References Cited

OTHER PUBLICATIONS

Cundiff, David K., et al. "Cardiovascular Disease Death Before Age 65 in 168 Countries Correlated Statistically with Biometrics, Socioeconomic Status, Tobacco, Gender, Exercise, Macronutrients, and Vitamin K," Cureus, (Aug. 24, 2016).
Meng-Dan. Li et al."Research advances of Bacillus natto and its application in food production," Journal of Food Safety and Quality, vol. 7, No. 8, (Aug. 2016).
Anonymous, "European Food Safety Authority (EFSA) Releases Scientific Opinion on Vitamin K2 Added to Consumer Foods and Vitamin K2 as Food Additive," Nov. 14, 2008.
Chinese Application No. 201910593690.9, First Office Action, Sep. 8, 2022.
Japanese Application No. 2021-546272, Notice of Reasons for Refusal, Dec. 1, 2022.
Nakagawa, "Vitamin K is converted to Vitamin K2 (menaquinone-4) in the body," Pharmacia 51, 220-24, 2015.

\* cited by examiner

BACILLUS SUBTILIS NATTO AND METHOD FOR PRODUCING MK-7

CROSS-REFERENCE TO RELATED APPLICATION

The present application is a U.S. National Phase Entry of International Application No. PCT/CN2019/094333 having an international filing date of Jul. 2, 2019, the entire content of which is hereby incorporated by reference.

TECHNICAL FIELD

The present application relates to, but is not limited to, the biological field, in particular to, but not limited to, a novel *Bacillus subtilis* natto strain CGMCC No. 17894, a method for producing vitamin K2 (MK-7) by fermentation with the strain, and use of the strain in preparation of vitamin K2 (MK-7).

BACKGROUND

Vitamin K2, is also known as Menaquinone, which is usually denoted by MK. It consists of a group of compounds with a total of 14 forms, the difference between which lies in the length of side chains. Of these forms, the representative molecules are MK-4 and MK-7. MK-7 has the characteristics of extensive functions, strong activities, long half-life, being safe, etc., and plays a very important role mainly in cell growth and metabolism and prevention of cardiovascular calcification, cerebrovascular calcification and calcification of renal vessels. The Office of Dietary Supplements (ODS) of the National Institutes of Health (NIH) evaluated vitamin K2 (MK-7) as a revolutionary and multi-functional vitamin. Vitamin K2 (MK-7) has the functions of promoting blood coagulation and alleviating arteriosclerosis. China has become an aging society, with a relatively high incidence of osteoporosis. A large number of studies have shown that vitamin K2 (MK-7) deficiency may lead to hip fracture and decrease of bone density in the elderly. Vitamin K2 (MK-7) deficiency may result in a decrease in serum uncarboxylated osteocalcin level, and may also result in a decrease in serum carboxylated osteocalcin level, and therefore may lead to a decrease in bone density in the elderly and a risk of hip fracture. Moreover, vitamin K2 (MK-7) may be used in the drugs for treating osteoporosis, cardiovascular and cerebrovascular calcification, cancers, diabetes, nephropathy and senile dementia, and has broad application prospects in health management.

According to "Cardiovascular Disease Death Before Age 65 in 168 Countries Correlated Statistically with Biometrics, Socioeconomic Status, Tobacco, Gender, Exercise, Macronutrients, and Vitamin K" (2016 Cureus 8 (8)), premature CVD mortality was 2.2 times in the male and female cohorts in countries (n=70) with an average daily intake of vitamin K2 (MK-7)<5 μg/2000 kcal than in countries (n=72) with an average daily intake of vitamin K2 (MK-7)>24 μg/2000 kcal. Therefore, supplementation of vitamin K2 (MK-7) is necessary for health. The content of vitamin K2 (MK-7) in natural food is extremely low, and it is basically impossible to get sufficient vitamin K2 (MK-7) from food.

For many years, many countries have been looking for ways to produce vitamin K2 (MK-7). There are several aspects: (1) chemical synthesis method: this method requires the use of organic solvents, which is not friendly to the environment and operators, and also leads to organic solvent residues in the product, with vitamin K2 (MK-7) of both cis structure and trans structure coexisting in the product; (2) extraction from solid fermented natto: the content of vitamin K2 (MK-7) in natto is extremely low, which is not competitive in the market; and (3) liquid fermentation of natural *Bacillus* natto: this method has a long period, but a low yield.

Based on the current state of production and demand of vitamin K2 (MK-7), there is a need in the world market for a more efficient method for producing vitamin K2 (MK-7).

SUMMARY

The present application provides *Bacillus subtilis* natto strain ST-1008, with accession number CGMCC No. 17894.

In another aspect, the present application provides a method for producing vitamin K2, including culturing the *Bacillus subtilis* natto strain CGMCC No. 17894 in a medium to produce vitamin K2 in the strain cells and the medium, and recovering and purifying vitamin K2 from the strain cells and the medium, wherein the vitamin K2 is MK-7.

In a further aspect, the present application also provides use of the *Bacillus subtilis* natto strain CGMCC No. 17894 in the preparation of vitamin K2.

In a further aspect, the present application also provides an MK-7 preparation, including MK-7 and MK-6, wherein MK-6 is 2 wt %-7 wt % of MK-7, and the preparation is in the form of an oil or a powder.

In the present application, the oil includes 0.1 wt %-20 wt % MK-7, 80 wt %-99 wt % carrier and 0.1 wt %-1 wt % antioxidant.

In the present application, the powder includes 0.1 wt %-20 wt % MK-7, 55 wt %-75 wt % adsorbent, 10 wt %-15 wt % solvent, 5 wt %-10 wt % powdering agent, 3 wt %-5 wt % emulsifier and 0.2 wt %-0.5 wt % antioxidant.

The present application further provides use of the MK-7 preparation in food or health products.

In a further aspect, the present application also provides a MK-7 pure premix, including 0.1 wt %-25 wt % MK-7, 74.5 wt %-99.7 wt % diluent and 0.2 wt %-0.5 wt % antioxidant.

The present application further provides use of the MK-7 pure premix in food or health products.

In a still further aspect, the present application provides pure MK-7, including 98 wt %-99.9 wt % MK-7 and 0.1 wt %-2 wt % MK-6.

The present application further provides use of the pure MK-7 in the preparation of a medicament for treating osteoporosis, cardiovascular and cerebrovascular calcification, vascular sclerosis in patients with kidney disease, tumors, muscle spasm, nervous system diseases, diabetes or psoriasis.

DETAILED DESCRIPTION

The following is a summary of the subject matter described in detail herein. This summary is not intended to limit the protection scope of the claims.

In order to overcome the shortcomings of the prior art and meet the market demand, an object of the present invention is to provide a method capable of producing vitamin K2 (MK-7) of pure trans structure with a high yield.

Specifically, in one aspect, the present application provides *Bacillus subtilis* natto ST-1008, with accession number of CGMCC No. 17894.

After many years of intensive and careful research, the applicant has obtained, by mutagenesis, a novel *Bacillus subtilis* natto ST-1008, CGMCC No. 17894, from wild-type *Bacillus subtilis* natto. The applicant isolated strains from six fresh commercial natto from different sources, and performed fermentation experiments after isolation and purification according to different colony morphologies, colony colors and bacterial growth speeds, and thus obtained a vitamin K2 (MK-7)-producing strain. The vitamin K2

(MK-7)-producing strain was used as the starting strain and subjected to UV mutagenesis. After 26 generations of UV mutagenesis, a morphological mutant strain was obtained, and the yield of vitamin K2 (MK-7) was increased by 20 folds. The morphological mutation and the yield of vitamin K2 (MK-7) were relatively stable after several generations of subculture. The code of the strain is ST-1008. The strain was deposited at China General Microbiological Culture Collection Center, with the address of NO. 3 of Court NO. 1 Beichen West Road, Chaoyang District, Beijing, Institute of Microbiology, Chinese Academy of Sciences under the accession number CGMCC No. 17894, date of deposit: Jun. 5, 2019.

The novel strain CGMCC No. 17894 provided by the present application has the following microbiological characteristics: Gram-positive bacterium, central spore, bacterium width 1 µm-2 µm and bacterium length 3 µm-5 µm. On an LB agar medium, the colony spreads evenly and is gray-yellow, the diameter of the colony is 0.3 cm-0.5 cm, and there is no pigment. Spores appear after 10 hours of culturing of the bacterium. In an LB liquid medium, the bacterium begins to germinate 30 minutes after inoculation; 1 hour after inoculation, the bacterium becomes a long string with no obvious gaps, with a length of about 11 µm-15 µm; 2 hours after inoculation, the bacterium becomes long strings with obvious gaps, each long string is composed of 8-12 bacteria connected in series, with a length of about 24 µm-36 µm; and 2.5 hours after inoculation, the long strings of bacteria begin to break into single bacteria.

In another aspect of the present application, there is provided a method for producing vitamin K2 (MK-7) by fermentation using the novel strain, which enables production of vitamin K2 (MK-7) with a relatively high yield.

The present application provides a method for producing vitamin K2, including culturing the *Bacillus subtilis* natto CGMCC No. 17894 in a medium to produce vitamin K2 in the strain cells and the medium, and recovering and purifying vitamin K2 from the strain cells and the medium, wherein the vitamin K2 is MK-7.

In the present application, the medium may be a conventional or known medium in the art. The medium includes carbon source substance and nitrogen source substance. An organic substance or an inorganic substance may also be added to the medium to promote the growth of microorganisms and improve the yield of vitamin K2 (MK-7).

In the present application, the medium includes 0.2 wt %-20 wt % carbon source substance and 0.2 wt %-20 wt % nitrogen source substance, wherein the carbon source substance is selected from any one or more of glucose, sucrose, maltose, fructose and glycerol; and the nitrogen source substance is selected from any one or more of yeast powder, tryptone, soybean powder, chickpea powder, beef extract and yeast extract.

In the present application, the medium further includes 0.001 wt %-0.5 wt % inorganic substance selected from any one or more of a phosphate salt, a magnesium salt and a sodium salt.

Preferably, the inorganic substance is selected from any one or more of sodium dihydrogen phosphate, disodium hydrogen phosphate, potassium dihydrogen phosphate, dipotassium hydrogen phosphate, magnesium sulfate, magnesium chloride and sodium chloride.

In the present application, the medium further includes a germination promoting substance and a precursor substance, wherein the germination promoting substance is selected from any one or more of boric acid, vitamin B1, copper sulfate and manganese sulfate; and the precursor substance is selected from any one or more of solanesol, ethanol, menaquinone and phytol.

Since the bacterium is *Bacillus subtilis* and there are spores in the culturing process, the elements that promote the germination of spores are defined as germination promoting substances.

In the present application, in the culturing process, according to the weight of the medium, the germination promoting substance is added at a concentration of 0.001%-0.5%; and in the culturing process, preferably, according to the weight of the medium, the precursor substance is added at a concentration of 0.003%-5% from the logarithmic growth phase to the stationary phase of the bacterium.

In the present application, the culturing is carried out under aerobic conditions, the culturing temperature is 35-50° C., the culturing time is 10-48 h, the pH is 5.5-8.0, and the pressure is 0.03-0.08 MPa.

The culturing may be carried out under conventional or known conditions in the art. The fermentation may be carried out under aerobic conditions, and the temperature may be 35-50° C., preferably 38-42° C. The culturing time is 10-48 hours, preferably 16-24 hours. In the fermentation process, the germination promoting substances, i.e., boric acid, vitamin B1, copper sulfate and manganese sulfate, are preferably added at the time of inoculation, at a preferable concentration (based on the medium) of 0.001%-0.1%. In the fermentation process, they are preferably added at the early stage of the growth of the bacterium, at a concentration (based on the medium) of 0.003%-5%.

The fermentation process may be carried out in a device conventional or known in the art and under conditions conventional or known in the art, for example, using a shaking flask at a rotational speed conventional or known in the art; or carried out in a conventional fermenter, such as a 5 L fermenter or a 5T fermenter.

In the present application, recovering and purifying vitamin K2 includes the following steps:
(1) subjecting the culture solution obtained in the culturing process to separation to obtain fermentation bacteria and fermentation supernatant;
(2) drying the fermentation bacteria;
(3) extracting the bacterial powder obtained in step (2) with an organic solvent, evaporating the resulting solution from the extraction under reduced pressure, and removing the solvent;
(4) decolorizing the product obtained in step (3) and reducing the peroxide value with a chromatographic column; and
(5) deacidifying the product obtained in step (4) with the chromatographic column to obtain a vitamin K2 product.

In the present application, in step (1), the separation is selected from one or two of separation by a ceramic membrane and separation by a centrifuge, and is preferably separation by a ceramic membrane.

In the present application, in step (2), the drying is selected from any one or more of spray drying, freeze drying and vacuum drying under reduced pressure, and is preferably spray drying.

The drying is preferably carried out in the dark.

In the present application, in step (3), the organic solvent is selected from any one or more of petroleum ether, ethanol, methanol, dichloromethane, isopropanol and ethyl acetate, and is preferably petroleum ether and ethyl acetate.

In the present application, in step (4), the filler of the chromatographic column is silica gel.

In the present application, in step (5), the filler of the chromatographic column is alumina. In step (4), the column filler used is silica gel, the organic solvent used is a conventional or known organic solvent in the art, such as petroleum ether, ethanol, ethyl acetate, etc., preferably petroleum ether, and the organic solvent is recovered by a conventional method of recovery under reduced pressure. In step (5), the column filler used is alumina, the organic solvent used is a conventional or known organic solvent in the art, such as petroleum ether, ethanol, ethyl acetate, etc., preferably petroleum ether, and the organic solvent is recovered by a conventional method of recovery under reduced pressure.

With the strain CGMCC No. 17894 of the present invention and the fermentation method of the present invention, the period is shortened to 16-24 hours, the yield is increased to 200-300 mg/L, and the problem of insufficient vitamin K2 (MK-7) content in food can be solved. mg/L refers to the ratio of MK-7 content to the total volume of fermentation broth.

In another aspect of the present application, there is further provided use of the *Bacillus subtilis* natto CGMCC No. 17894 in the preparation of vitamin K2.

In a further aspect of the present application, the present application also provides a MK-7 preparation, including MK-7 and MK-6, wherein MK-6 is 2 wt %-7 wt % of MK-7, and the preparation is in the form of an oil or a powder.

In the present application, the oil includes 0.1 wt %-20 wt % MK-7, 80 wt %-99 wt % carrier and 0.1 wt %-1 wt % antioxidant.

In the present application, the carrier is selected from any one or more of soybean oil, corn oil, sunflower seed oil, olive oil and medium chain triglycerides; and the antioxidant is selected from any one or more of rosemary, ferulic acid, tocopherol and gossypol.

In the present application, on a weight basis, the powder includes 0.1 wt %-20 wt % MK-7, 55 wt %-75 wt % adsorbent, 10 wt %-15 wt % solvent, 5 wt %-10 wt % powdering agent, 3 wt %-5 wt % emulsifier and 0.2 wt %-0.5 wt % antioxidant.

In the present application, the adsorbent is selected from any one or more of modified starch, resistant dextrin, microcrystalline cellulose and dietary fibers;

the solvent is selected from any one or more of soybean oil, corn oil, sunflower seed oil, olive oil and medium chain triglycerides;

the powdering agent is selected from any one or more of sodium caseinate, casein phosphopeptide and phosphorylated distarch phosphate;

the powdering agent is selected from any one or two of starch sodium octenylsuccinate and starch octenylsuccinate ester;

the emulsifier is selected from any one or more of monoglycerol fatty acid ester, diglycerol fatty acid ester, Arabic gum, soybean phospholipid, glyceryl caprylate, monopalmitate, polyoxyethylene sorbitan, sodium stearoyl lactylate, calcium stearyl lactylate, and diacetyl tartaric acid monoglyceride; and the antioxidant is selected from any one or more of ascorbyl palmitate, erythorbic acid, sodium erythorbate, tocopherol, glutathione, citric acid, ethylenediaminetetraacetic acid (EDTA) and carotenoid.

The present application further provides use of the MK-7 preparation in food or health products.

In a still further aspect of the present application, the present application also provides a MK-7 pure premix, including 0.1 wt %-25 wt % MK-7, 74.5 wt %-99.7 wt % diluent and 0.2 wt %-0.5 wt % antioxidant.

In the present application, the diluent is selected from any one or more of modified starch, resistant dextrin, microcrystalline cellulose and dietary fibers; and the antioxidant is selected from any one or more of ascorbyl palmitate, erythorbic acid, sodium erythorbate, tocopherol, glutathione, citric acid, EDTA and carotenoid.

The present application further provides use of the MK-7 pure premix in food or health products.

In a still further aspect of the present application, the present application provides pure MK-7, including 98 wt %-99.9 wt % MK-7 and 0.1 wt %-2 wt % MK-6.

The present application further provides use of the pure MK-7 in the preparation of a medicament for treating osteoporosis, cardiovascular and cerebrovascular calcification, vascular sclerosis in patients with kidney disease, tumors, muscle spasm, nervous system diseases, diabetes or psoriasis.

In the present application, the term "MK-7 pure premix" refers to the powder obtained by adding a diluent and an antioxidant to pure MK-7, and then subjecting the mixture to the procedures of sieving, mixing and drying.

Other features and advantages of the present application will be set forth in the following description, and in part will become apparent from the description, or be learned by practice of the present application. The objects and other advantages of the present application may be realized and obtained by the structure particularly pointed out in the description and claims.

EXAMPLES

In order to make the object, technical schemes and advantages of the present application clearer, the examples of the present application will be described below in detail. It should be noted that the embodiments in the present application and the features in the embodiments may be combined with each other arbitrarily if there is no conflict.

Example 1

Isolation of Vitamin K2 (MK-7)-Producing *Bacillus subtilis* Natto from Commercial Natto Natto (purchased from Japan Bio Science Laboratory Co., Ltd.) was dissolved in sterile water and diluted, then smeared on a solid LB medium plate, and cultured at a constant temperature of 37° C. for 24 hours. White colonies grew on the surface of the plate, which exhibited ropy phenomenon when picked with an inoculation needle. The white colonies were transferred to an LB slant medium, cultured at 37° C. for 24 hours, inoculated into a fermentation medium (20 ml in a 100 ml Erlenmeyer flask, medium formula: glucose 2%, glycerol 4%, soybean powder 3%, magnesium sulfate 0.01%, dipotassium hydrogen phosphate 0.01%, sodium chloride 0.5%, and serine 0.08%) with an inoculating loop, shaken at 37° C. at 270 rpm for 48 hours, and added with equal volume of ethyl acetate for extraction. After layering, the ethyl acetate layer was dried to obtain an extractum. Through high performance liquid chromatography analysis, microorganism corresponding to samples which have the same retention time as the standard was selected, and finally *Bacillus subtilis* natto for producing vitamin K2 (MK-7) was identified. The microorganism has the following microbiological characteristics: Gram-positive bacterium, central spore, bacterium width of 0.2 μm and bacterium length of 1 μm-2 μm. On an LB agar medium, the colony is white and protrudes from the surface of the medium, the surface of the colony is wrinkled, the colony is sticky and ropy, has a diameter of 0.3-0.5 cm, and has no pigments, and spores appear after 10 hours of culturing.

Example 2

Mutagenesis of Vitamin K2 (MK-7)-Producing Strain

The vitamin K2 (MK-7)-producing strain obtained in Example 1 was used as the starting strain for UV mutagenesis, and after 36 generations of mutagenesis, a mutant strain ST-1008 was obtained. The microorganism has the following microbiological characteristics: Gram-positive bacterium, central spore, bacterium width of 0.5 μm and bacterium length of 2 μm-3 μm. On an LB agar medium, the colony spreads evenly and is gray-yellow, the diameter of the colony is 0.3 cm-0.5 cm, and there is no pigment. Spores appear after 10 hours of culturing of the bacterium. In an LB liquid medium, the bacterium begins to germinate 30 minutes after inoculation; 1 hour after inoculation, the bacterium becomes a long string with no obvious gaps, with a length of about 11 μm-15 μm; 2 hours after inoculation, the bacterium becomes long strings with obvious gaps, each long string is composed of 8-12 bacteria connected in series, with a length of about 24 μm-36 μm; and 2.5 hours after inoculation, the long strings of bacteria begin to break into single bacteria. The strain was deposited at China General Microbiological Culture Collection Center, with the address of NO. 3 of Court NO. 1 Beichen West Road, Chaoyang District, Beijing, Institute of Microbiology, Chinese Academy of Sciences, under the accession number CGMCC No. 17894.

Example 3

Seed Preparation

The CGMCC No. 17894 strain obtained in the example was inoculated into 50 ml of seed medium (see Table 1) and incubated at 38-42° C., 150-300 rpm shaking in an incubator for 3-16 hours, obtaining a strain to be inoculated.

TABLE 1

Formulation of seed medium:

| Components | Content g % |
|---|---|
| Glucose | 1.0 |
| Tryptone | 1.0 |
| Yeast extract | 0.5 |
| Magnesium sulfate | 0.05 |
| NaCl | 1.0 |
| Pure water | 100 ml |
| pH | 7.0 |

Example 4

Fermentation in a 5 L Fermenter

The seed obtained in Example 3 was inoculated into a fermentation production basal medium (see Table 2) at an inoculation amount of 20% of the fermentation medium, and cultured at 42° C. After 30 minutes of culturing, a feed medium (see Table 3) was added in a fed-batch manner, and 100 ml of feed medium was added every half hour for 20 hours, with a total of 2 L feed medium being added. Germination promoting substances, i.e., 0.001% boric acid, 0.001% vitamin B1 and 0.001% copper sulfate, were added during inoculation; and when the culturing proceeded for 4 hours, the precursor substance, i.e., 0.05% ethanol, was added. The pH value in the culturing process was kept unadjusted, and the concentration of oxygen dissolved was controlled to be above 30%. The fermentation period was 24 hours. The fermentation yield determined by high performance liquid chromatography was 200 mg/L, and the specific conditions for high performance liquid chromatography were as shown in Table 2.

TABLE 2

Conditions for high performance liquid chromatography
Conditions for high performance liquid chromatography

| Instrument | Agilent 1260II high performance liquid chromatography |
|---|---|
| Chromatographic column | Proscell-EC-C18 |
| Size of chromatographic column | 3 × 150 mm |
| Filler particles | 0.3 um |
| Bonding phase | C18 |
| Column temperature | 50° C. |
| Ultraviolet detection | 254 nm |
| Mobile phase | 100% methanol |
| Flow rate | 1 ml/min |
| Sample injection | 10 uL |
| Time | 25 min |
| Retention time | 11.8 mm |

TABLE 3

Basal medium

| Components | (g %) |
|---|---|
| Tryptone | 0.4 |
| Yeast extract | 0.1 |
| Glycerol | 0.9 |
| Glucose | 0.1 |
| $K_2HPO_4$ | 0.1 |
| Serine | 0.01 |
| Pure water | 100 ml |

TABLE 4

Feed medium

| Components | (g %) |
|---|---|
| Yeast powder | 5 |
| Soybean powder | 5 |
| Glucose | 1 |
| Glycerol | 15 |
| $K_2HPO_4$ | 0.2 |
| Pure water | 100 ml |

Note: In Tables 1, 3 and 4, g % refers to grams of solute added per 100 ml of solvent The fermentation broth obtained was subjected to solid-liquid separation with a ceramic membrane, the resultant concentrated solution of bacteria was vacuum dried, and to the resultant bacterial powder, ethanol or petroleum ether at a weight ratio of the bacterial powder:petroleum ether or ethanol=1:3 was added for extraction. After extraction, the organic phase was separated and recovered under reduced pressure to obtain a crude product containing vitamin K2. The crude product was decolorized with silica gel as the column filler and petroleum ether as the mobile phase. The decolorized crude product passed through an alumina column, using petroleum ether as the mobile phase to reduce the acid value. Vitamin K2 (MK-7) was obtained, with a yield of 80%.

TABLE 5

Conditions for elution of silica gel column
Conditions for elution of silica gel column

| Instrument | Jiangyin Jinque low pressure chromatographic column system 600-1050 |
|---|---|
| Chromatographic column | Stainless steel column |
| Size of chromatographic column | 600 mm × 1050 mm |

TABLE 5-continued

Conditions for elution of silica gel column
Conditions for elution of silica gel column

| | |
|---|---|
| Instrument | Jiangyin Jinque low pressure chromatographic column system 600-1050 |
| Filler particles | 100-200 mesh silica gel |
| Mobile phase | Petroleum ether |
| Flow rate | 300 L/H |
| Time | 4 h |

TABLE 6

Conditions for elution of alumina column
Conditions for elution of alumina column

| | |
|---|---|
| Instrument | Jiangyin Jinque low pressure chromatographic column system 325/273-950 |
| Chromatographic column | Stainless steel column |
| Size of chromatographic column | 325 mm × 950 mm and 273 mm × 950 mm in series connection |
| Filler particles | 100 mesh alumina |
| Mobile phase | Petroleum ether |
| Flow rate | 160 L/H (126 L/H) |
| Time | 5 h |

Example 5

This example is different from Example 4 in that germination promoting substances, i.e., 0.05% boric acid, 0.001% vitamin B1, 0.05% copper sulfate and 0.05% manganese sulfate, were added during inoculation. The fermentation yield was 260 mg/L.

Example 6

This example is different from Example 4 in that germination promoting substances, i.e., 0.1% boric acid, 0.1% vitamin B1, 0.1% copper sulfate and 0.1% manganese sulfate, were added during inoculation. The fermentation yield was 220 mg/L.

Example 7

This example is different from Example 5 in that the precursor substance, i.e., 0.05% solanesol, was added when the culturing proceeded for 4 hours, and the fermentation yield was 280 mg/L.

Example 8

This example is different from Example 7 in that the precursor substance, i.e., 0.05% solanesol and 0.05% ethanol, were added when the culturing proceeded for 4 hours. The fermentation yield was 300 mg/L.

Example 9

This example is different from Example 8 in that to the dried bacterial powder, ethyl acetate at a weight ratio of 1:3 was added for extraction. The yield of vitamin K2 (MK-7) was 90%.

Example 10

This example is different from Example 8 in that to the dried bacterial powder, ethyl acetate at a weight ratio of 1:3 was added for extraction. The yield of vitamin K2 (MK-7) was 98%.

For the vitamin K2 obtained by the fermentation method of the present application, the disadvantages of chemical synthesis of vitamin K2, such as producing a large number of isomers and many by-products, having a low yield, causing environmental pollution, etc., are overcome; moreover, the isoprene side chains thereof are mostly of cis structure, which has relatively low activities. For the vitamin K2 obtained by the fermentation method of the present application, the fermentation yield may reach 300 mg/L, the yield of purifying the bacterial powder may reach 98%, and the vitamin K2 obtained is found to have completely the same hydrogen spectrum data as all-trans vitamin K2, namely MK-7, as identified by the structure analysis.

Example 11

K2 (MK-7) 2 g, soybean oil 120 g, modified starch 743 g, sodium caseinate 100 g, starch sodium octenylsuccinate 20 g, monoglycerol fatty acid ester 10 g and ascorbyl palmitate 5 g.

K2 (MK-7) was weighed. Soybean oil was added to K2 (MK-7) and homogenized by stirring to dissolve K2 (MK-7) completely. Subsequently, ascorbyl palmitate, monoglycerol fatty acid ester, starch sodium octenylsuccinate and sodium caseinate were added and homogenized by stirring. Then modified starch was added, and homogenized by stirring, passed through a 80 mesh sieve, and dried at 80° C. for 2 hours to obtain 1 kg 2000 ppm vitamin K2 (MK-7) powder.

Example 12

K2 (MK-7) 2 g, soybean oil 988 g, rosemary 10 g
To K2 (MK-7), Rosemary and then soybean oil was added, and homogenized by stirring to dissolved K2 (MK-7) completely, obtaining 1 Kg 2000 ppm vitamin K2 (MK-7) oil.

Example 13

Properties of MK-7 powder and MK-7 oil

TABLE 7

Property comparison between MK-7 powder of Example 11 and existing MK-7 powder
Comparison between Indexes for MK-7 powder of Example 11 and existing MK-7 powder

| Manufacturer | Source | Trans structure | Appearance | Stability |
|---|---|---|---|---|
| Kappa Bioscience | Synthesis | 95% | Prone to agglomerate, odorless | No addition of antioxidant or emulsifier, K2 being easily oxidized and unstable |
| Good Scend | Synthesis | Impossible to be fixed | Prone to agglomerate, odorless | No addition of antioxidant or emulsifier, K2 being easily oxidized and unstable |
| Viridis BioPharma | Fermentation | 95% | Prone to agglomerate, odorless | No addition of antioxidant or emulsifier, K2 being easily oxidized and unstable |

TABLE 7-continued

Property comparison between MK-7 powder of Example 11 and existing MK-7 powder
Comparison between Indexes for MK-7 powder of Example 11 and existing MK-7 powder

| Manufacturer | Source | Trans structure | Appearance | Stability |
|---|---|---|---|---|
| MK-7 powder of Example 11 | Fermentation | 100% | Loose powder, with fragrant smell | Addition of antioxidant and emulsifier, K2 being stable and not easy to be oxidized |

TABLE 8

Property comparison between MK-7 oil of Example 12 and existing MK-7 oil
Index for comparison between MK-7 oil of Example 12 and existing oil

| Manufacturer | Source | Trans structure | Formulation process | Acid value | Peroxide value | Stability |
|---|---|---|---|---|---|---|
| Kappa Bioscience | Synthesis | 95% | Conventional mixing | ≤2 | ≤5 | No addition of antioxidant or emulsifier, K2 being easily oxidized and unstable |
| GoodScend | Synthesis | Impossible to be fixed | Conventional mixing | ≤2 | ≤5 | No addition of antioxidant or emulsifier, K2 being easily oxidized and unstable |
| Viridis BioPharma | Fermentation | 95% | Conventional mixing | ≤3 | ≤7 | No addition of antioxidant or emulsifier, K2 being easily oxidized and unstable |
| MK-7 oil of Example 12 | Fermentation | 100% | Nanolized process | ≤1 | ≤4 | Addition of antioxidant and emulsifier, K2 being stable and not easy to be oxidized |

The stability of MK-7 powder and MK-7 oil and the stability of the existing powder and oil were determined according to Announcement No. 8, 2016 of National Health and Family Planning Commission, and the acid value and peroxide value were determined according to the first method of GB 5009.229-2016 and the first method of GB 5009.227-2016, respectively.

Example 14

K2 (MK-7) 2 g, Ascorbyl Palmitate 2 g, and Microcrystalline Cellulose 996 g

K2 (MK-7) was weighed. Ascorbyl palmitate was added to K2 (MK-7), and homogenized by mixing and passed through a 80 mesh sieve. Microcrystalline cellulose was added by nongeometric dilution (1:2) for 5 times, and again passed through a 80 mesh sieve; then the remaining microcrystalline cellulose was added thereto, and the mixture was mixed well, passed through a 80 mesh sieve, and dried at 80° C. for 2 hours, thus obtaining 1 kg vitamin K2 (MK-7) premix of 2000 ppm.

Example 15

Properties of MK-7 Pure Premix

TABLE 9

Property comparison between MK-7 pure premix of Example 14 and existing MK-7 premix
Index for comparison between MK-7 pure premix of Example 14 and existing pure premix

| Manufacturer | Source | Trans structure | Appearance | Stability | Formulation stability |
|---|---|---|---|---|---|
| Kappa Bioscience | synthesis | 95% | 40 mesh particles, prone to be uneven and produce stains | No addition of antioxidant or emulsifier, K2 being easily oxidized and unstable | K2 being unstable when formulated with calcium and magnesium |
| GoodScend | synthesis | Impossible to be fixed | 40 mesh particles, prone to be uneven and produce stains | No addition of antioxidant or emulsifier, K2 being easily oxidized and unstable | K2 being unstable when formulated with calcium and magnesium |

TABLE 9-continued

Property comparison between MK-7 pure premix of Example 14 and existing MK-7 premix
Index for comparison between MK-7 pure premix of Example 14 and existing pure premix

| Manufacturer | Source | Trans structure | Appearance | Stability | Formulation stability |
|---|---|---|---|---|---|
| Viridis BioPharma | fermentation | 95% | 40 mesh particles, prone to be uneven and produce stains | No addition of antioxidant or emulsifier, K2 being easily oxidized and unstable | K2 being unstable when formulated with calcium and magnesium |
| MK-7 pure premix of Example 14 | fermentation | 100% | 60 mesh particles, and having uniform color | Addition of antioxidant and emulsifier, K2 being stable and not easy to be oxidized | K2 being stable when formulated with calcium and magnesium |

The stability of the pure premix of Example 14 and the stability of the existing pure premix were determined according to Announcement No. 8, 2016 of National Health and Family Planning Commission.

Although the embodiments disclosed in the present application are as above, the contents described are only the embodiments adopted for the convenience of understanding the present application, and are not used to limit the present application. Any person skilled in the field to which the present application belongs may make any modifications and changes in the implementation form and details without departing from the spirit and scope disclosed by the present application, and the scope of patent protection of the present application shall still be subject to the scope defined by the appended claims.

What we claim is:

1. *Bacillus subtilis* natto strain ST-1008, with Accession Number CGMCC No. 17894.

2. A method for producing MK-7, comprising culturing *Bacillus subtilis* natto strain ST-1008 with Accession Number CGMCC No. 17894 in a medium to produce MK-7 in the strain cells and the medium, and recovering and purifying MK-7 from the strain cells and the medium.

3. The method according to claim 2, wherein based on the weight of the medium, the medium comprises 0.2%-20% carbon source substance and 0.2%-20% nitrogen source substance, wherein the carbon source substance is selected from any one or more of glucose, sucrose, maltose, fructose and glycerol; and the nitrogen source substance is selected from any one or more of yeast powder, tryptone, soybean powder, chickpea powder, beef extract and yeast extract.

4. The method according to claim 2, wherein based on the weight of the medium, the medium further comprises 0.001%-0.5% inorganic substance selected from any one or more of a phosphate salt, a magnesium salt and a sodium salt; and
wherein the phosphate salt is selected from any one or more of sodium dihydrogen phosphate, disodium hydrogen phosphate, potassium dihydrogen phosphate, and dipotassium hydrogen phosphate; the magnesium salt is selected from any one or more of magnesium sulfate, and magnesium chloride; the sodium salt is sodium chloride.

5. The method according to claim 2, wherein the medium further comprises a germination promoting substance and a precursor substance, the germination promoting substance is selected from any one or more of boric acid, vitamin B1, copper sulfate, manganese sulfate and serine; and the precursor substance is selected from any one or more of solanesol, ethanol, menaquinone and phytol.

6. The method according to claim 5, wherein in the culturing process, the germination promoting substance is added at a concentration of 0.001%-0.5% based on the weight of the medium; and in the culturing process, the precursor substance is added at a concentration of 0.003%-5% based on the weight of the medium.

7. The method according to claim 2, wherein the culturing is carried out under aerobic conditions, the culturing temperature is 35-50° C., the culturing time is 10-48 h, the pH is 5.5-8.0, and the pressure is 0.03-0.08 MPa.

8. The method according to claim 2, wherein recovering and purifying MK-7 comprises the steps of:
(1) subjecting the culture solution obtained in the culturing process to separation to obtain fermentation bacteria and fermentation supernatant;
(2) drying the fermentation bacteria;
(3) extracting the dried bacteria obtained in step (2) with an organic solvent, evaporating the resulting solution from the extraction under reduced pressure, and removing the solvent;
(4) decolorizing the product obtained in step (3) and reducing the peroxide value with a chromatographic column; and
(5) deacidifying the product obtained in step (4) with the chromatographic column to obtain MK-7,
wherein in step (1), the separation is selected from one or two of separation by ceramic membrane and separation by centrifuge;
in step (2), the drying is selected from any one or more of spray drying, freeze drying and vacuum drying under reduced pressure;
the drying is carried out in the dark;
in step (3), the organic solvent is selected from any one or more of petroleum ether, ethanol, methanol, dichloromethane, isopropanol and ethyl acetate;
in step (4), the filler of the chromatographic column is silica gel;
in step (5), the filler of the chromatographic column is alumina.

9. The method according to claim 6, wherein the precursor substance is added at a concentration of 0.003%-5% based on the weight of the medium, from the logarithmic growth phase to the stationary phase of the bacterium.

10. The method according to claim 8, wherein in step (1), the separation is separation by ceramic membrane;

in step (2), the drying is spray drying;

in step (3), the organic solvent is petroleum ether and ethyl acetate.

* * * * *